July 15, 1924.  
E. MOSER  
1,501,289  
REMOVABLE CLEANABLE MEAT HOLDER OR PLATE FOR SLICING MACHINES  
Filed Aug. 4, 1923

INVENTOR.  
ERNEST MOSER.  
BY  
ATTORNEY.

Patented July 15, 1924.

1,501,289

UNITED STATES PATENT OFFICE.

ERNEST MOSER, OF NEW YORK, N. Y.

REMOVABLE, CLEANABLE MEAT HOLDER OR PLATE FOR SLICING MACHINES.

Application filed August 4, 1923. Serial No. 655,566.

*To all whom it may concern:*

Be it known that I, ERNEST MOSER, a citizen of the United States, residing at New York city, in the county of New York and State of New York, have invented certain new and useful Improvements in Removable, Cleanable Meat Holders or Plates for Slicing Machines, of which the following is a specification.

This invention relates to meat slicing machines, it more particularly relating to that part of the machine constructed to carry the meat to and fro from the cutter or revolving knife, the object of the invention being to provide an improved removable, readily cleanable meat carrying plate or support which can be readily removed, cleaned and replaced without danger to the worker's hands and without liability of tearing or mutilating the cleansing material or cloth. In meat slicing machines the feeding plate for feeding the meat toward the slicer or cutter is usually provided with upstanding prongs for impinging the meat and holding it in place to be sliced, and it is necessary to frequently cleanse this feeding plate. This is more or less difficult to do because of the upstanding prongs which are rigidly carried by the plate. Aside from this these prongs are dangerous, frequently cutting and tearing the hands of the user unless he is extremely careful, and also tearing and mutilating the cleaning cloth, so that the user has to exercise great care which requires considerable time.

The object therefore of the present improvement is the provision of an improved removable and prongless plate which can be readily removed and easily cleaned without danger to the operator or liability of tearing the cleaning cloth, and which when cleaned can be readily placed in position in the machine to carry the meat.

This plate may be constructed of any suitable size and shape to adapt it to various forms of machines, but is herein shown as adapted to a common form of machine, only so much of which is shown as is necessary to illustrate the invention.

Figure 1:
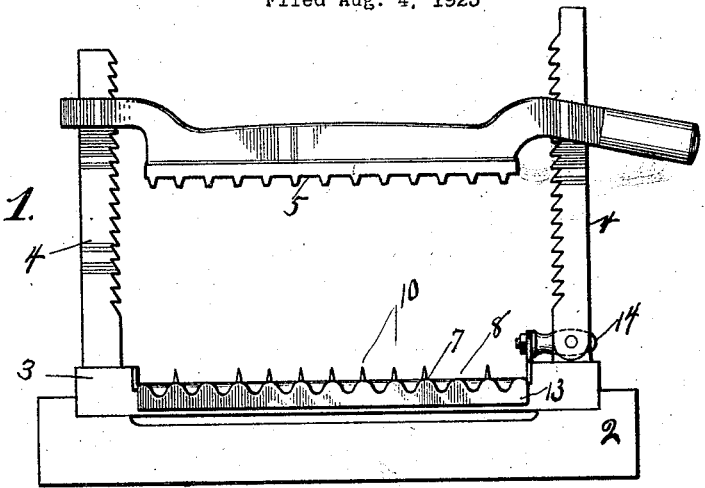
Figure 2:
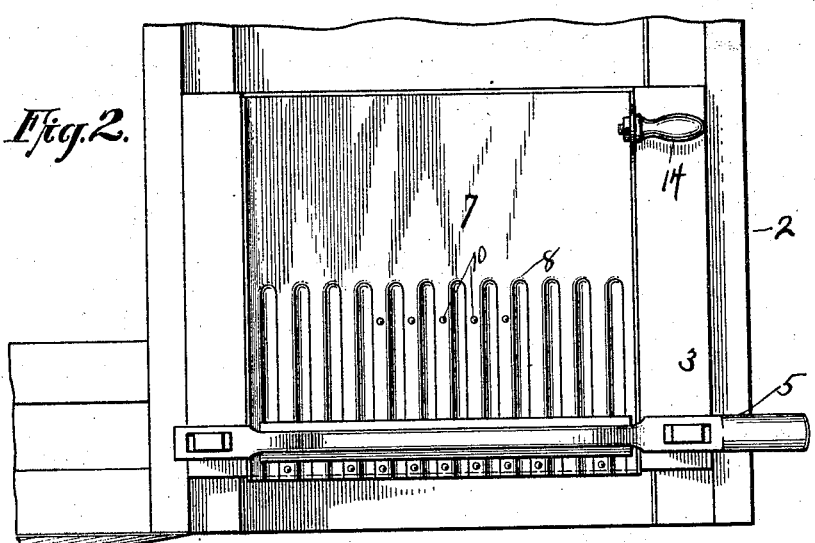
Figure 3:
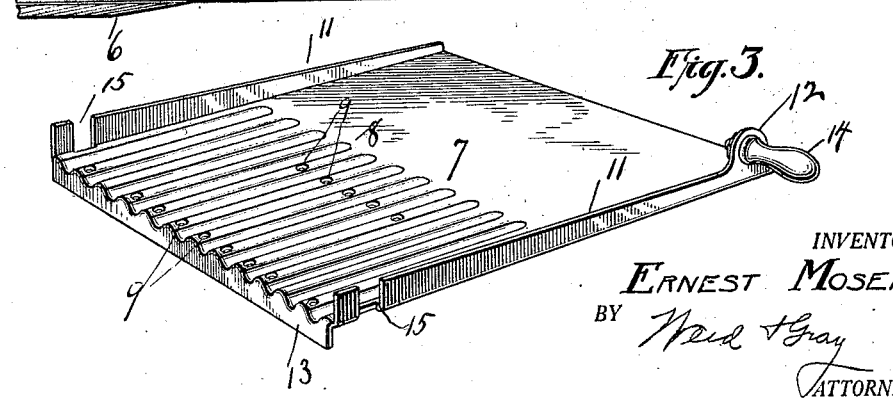

In the drawings accompanying and forming a part of this specification Fig. 1 illustrates a front view of so much of a meat slicing machine as is necessary to illustrate the present improvement; Fig. 2 is a top or plan view of the parts shown in Fig. 1; and Fig. 3 is a perspective view of the improved removable and cleanable meat support or plate.

Similar characters of reference indicate corresponding parts in the several views of the drawings.

Before explaining in detail the present improvement and mode of operation thereof, it is desired to have it understood that the invention is not limited to the details of construction and arrangement of parts which are illustrated in the accompanying drawings, since the invention is capable of other embodiments, and that the phraseology which is employed is for the purpose of description and not of limitation.

The bed of the machine 2 carries the usual meat support 3 provided with toothed standards 4 for the meat clamping member 5 and is shown as a corrugated meat support carrying upstanding prongs for impinging the meat. This meat support is usually fed by suitable mechanism (not shown) toward and from the cutter or rotating knife 6 (see Fig. 2) so as to slice the meat on the support and is also fed in a transverse direction by suitable mechanism (not shown) so that the cutter will slice a predetermined thickness of the meat. In the present improvement the meat is carried by a removable and readily cleanable plate 7, which for lightness is preferably constructed of aluminum. This plate 7 is at its forward half provided with a series of grooves or groove forming corrugations 8 adapted to register with the corrugations of the ordinary meat support or feeding plate and also with a series of openings 9 so located as to receive therethrough the usual prongs 10 carried by the meat support or feeding plate. These corrugations are so formed in the plate that grooves are formed at the top or meat engaging side of the plate, which will act to carry off the juices of the meat toward the apron. The plate is provided with upturned side edges or flanges 11 having a pair of recesses 15 at its forward end for the reception of the meat clamping member when this is adjusted to its lowermost position. These side flanges taper toward the rear of the plate and one thereof is provided with a lug or ear 12 for the reception of a suitable laterally extending handle 14 by which the plate can be readily removed and replaced as well as handled. The forward edge of this plate is preferably bent or turned down as at 13 to form an apron to facilitate the passage of the meat juices from the grooves and away from the plate.

In use this plate is located on the usual meat support or feeding plate in such manner that the prongs will extend through the openings in the plate 7 whereby the plate 7 is held in position and whereby the meat will also be impinged and properly held at the bottom thereof in the usual manner. When it is desired to remove the plate it is merely necessary to remove it from the prongs and machine and clean it with a cloth without injury to the user or to the cloth since there are no prongs on the plate itself to interfere with the operation, and then the plate can be readily replaced and the machine continued in use.

Thus it will be seen that I have provided a comparatively inexpensive, durable, readily detachable and attachable meat supporting plate which can be readily cleaned without liability of injury to the user or operator and without mutilating or tearing the cleaning cloth, and which is therefore very sanitary in its construction.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A removable meat supporting plate for slicing machines having a downwardly extending apron at its forward edge, and openings for the passage of pins or prongs.

2. A removable meat supporting plate for slicing machines having a series of grooves therein, and a plurality of openings for the passage of pins or prongs, and a downwardly extending apron at its forward edge.

3. A removable meat supporting plate for slicing machines having a downwardly extending apron at its forward edge.

4. A removable meat supporting plate for slicing machines having a series of grooves therein, a series of openings for the passage of pins or prongs and provided with a depending apron at its front edge, and a pair of upstanding flanges at its side edges, one of said flanges having a handle.

5. An one-piece removable meat supporting plate having a plurality of openings therein for the passage of prongs or pins, said plate having upstanding side flanges and a series of grooves, and terminating at its front end in a depending apron.

6. A removable meat supporting plate for slicing machines having corrugations therein and also having a downwardly extending apron at its forward edge.

7. A movable meat supporting plate for slicing machines having a plurality of openings therein for the passage of pins or prongs and having a depending apron at its forward end, a handle at its rear end, and a series of grooves therein, said plate also having upstanding recesses and tapering side flanges.

8. A one-piece removable meat supporting plate for slicing machines having a depending portion at its forward end, an upstanding portion at its side, and a plurality of openings for the passage of pins or prongs, and also having a series of grooves therein adapted to register with similar grooves in the permanent feeding plate of a slicing machine.

9. A removable meat supporting plate for slicing machines having a series of openings therein adapted to receive pins or prongs and having at its forward end a depending apron and also provided with a series of corrugations.

10. A removable and cleanable meat supporting plate for slicing machines having a plurality of openings therein for the passage of meat impaling pins or prongs and provided with upstanding side flanges, and each having adjacent to its front end a recess open at the upper edge of such flange.

Signed at Patchogue, Long Island, New York, this 23d day of July, 1923.

ERNEST MOSER.